May 11, 1937.  F. G. NEGUS  2,079,950
ELECTRICAL WATER PURIFIER
Filed Aug. 19, 1936
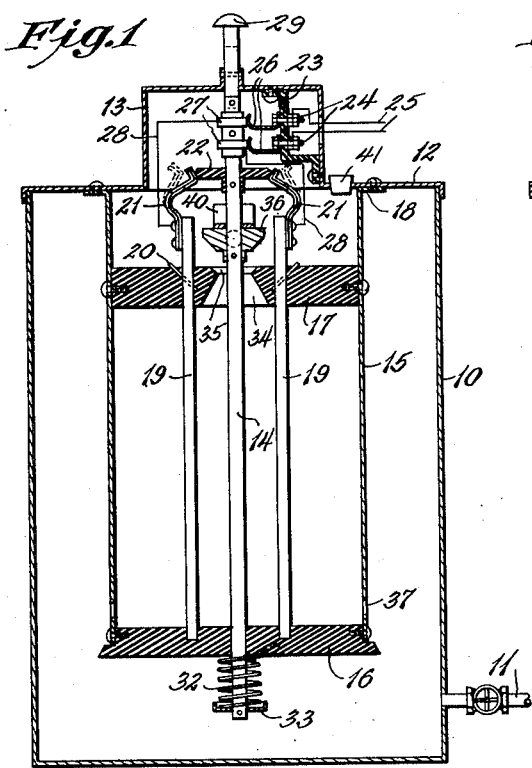
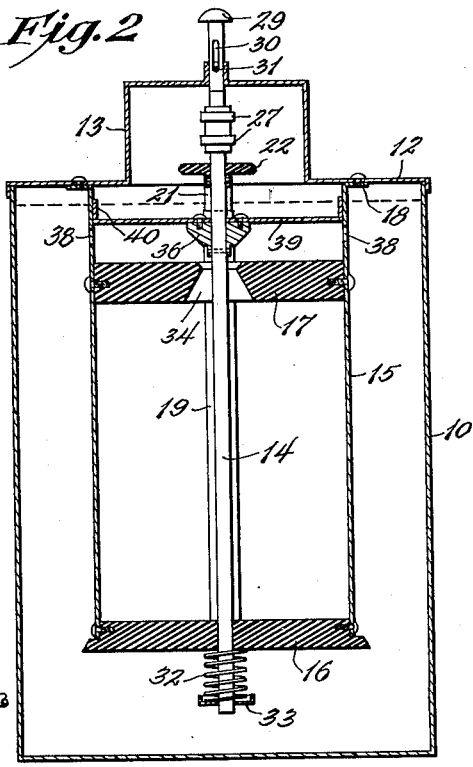
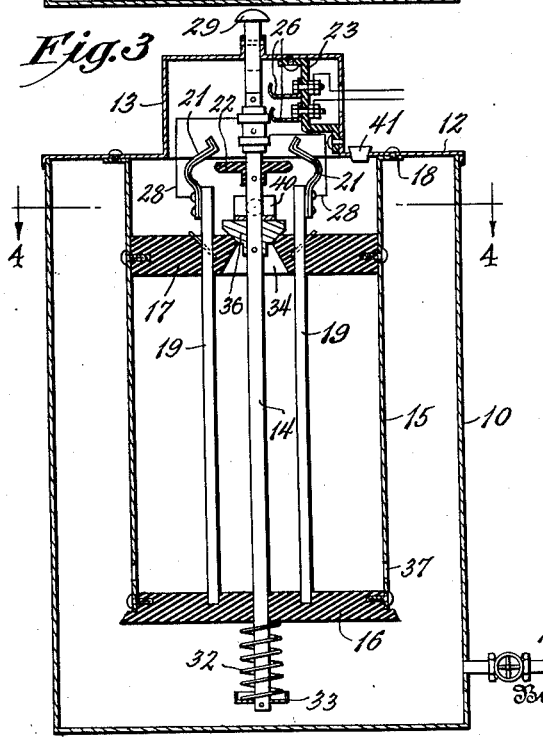
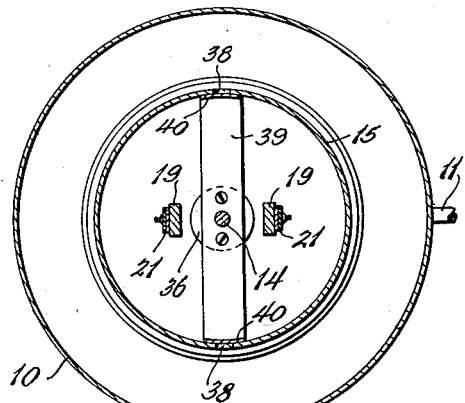
Inventor
F. G. Negus
A. D. Adams
Attorney Patented May 11, 1937

2,079,950

UNITED STATES PATENT OFFICE 2,079,950

ELECTRICAL WATER PURIFIER

Frank G. Negus, Halifax, Nova Scotia, Canada, assignor of one-half to H. Borden Clarke, Montreal, Quebec, Canada Application August 19, 1936, Serial No. 96,878

6 Claims. (Cl. 204—25)

This invention relates to water purifiers and, among other objects, aims to provide a novel, simplified and greatly improved electrical purifier for the purpose of removing organic and inorganic impurities suspended or dissolved in the water by electrolytic action. One of the main ideas is to provide a compact electrical purifier unit having automatic means to trap the floating impurities after the water has been heated to the required treating temperature.

Other aims and advantages of the invention will appear in the specification, when considered in connection with the accompanying drawing, wherein:

Fig. 1 is a vertical central sectional view of a purifier embodying the invention;

Fig. 2 is a sectional view taken at right angles to Fig. 1;

Fig. 3 is a sectional view similar to Fig. 1, but showing the sludge chamber closed after a charge of water has been treated; and Fig. 4 is a sectional view taken on the line 4—4 of Fig. 3.

Referring particularly to the drawing, the purifier there shown is of the type adapted to treat a single charge of water at a time, but it is to be understood that it may be adapted for treating boiler feed water and the like and used in large installations wherein the sludge or impurities may be trapped and removed at more or less frequent intervals and the water is admitted continuously or intermittently to a treating container.

In this instance, the water is adapted to be treated in a tank 10 which happens to be shown as being cylindrical and having an open upper end. It is also shown as having a valved outlet conduit 11 so that the treated water may be removed from it. The outlet conduit is connected slightly above the bottom of the tank so that any sediment which settles in the bottom will not flow out through it.

In accordance with this invention, the electrical treating device is adapted to be inserted in the tank as a single unit which is attached to a flanged cover 12 for the tank. The flanged cover is shown as having a cylindrical dome 13 to accommodate an electric switch and through which projects a combined valve and switch stem 14 hereinafter described in detail.

Depending from the cover there is shown a cylindrical container 15 having a bottom wall 16 and a partition 17 near the upper end, both of which are made of suitable insulating material. This container is shown as presenting an annular flange 18 suitably secured to the inside wall of the cover.

In this example, a pair of ordinary aluminum electrodes 19, conveniently rectangular in cross section, are supported by the bottom wall 16 of the container and project through openings in the partition 17 being conveniently secured against longitudinal displacement in said partition by means of pins 20. The electrodes are suitably spaced and terminate above the partition 17. A pair of bent bimetallic elements 21 are secured to the upper ends of the electrodes and are adapted to expand outwardly as shown in dotted lines in Fig. 1. They are normally positioned as shown in full lines to cooperate with a holding disk or member 22 of insulating material fixed on the combined valve and switch stem 14.

Within the dome 13 there is shown a bracket 23 made of insulating material and carrying a pair of binding posts 24 to which are connected the electrical conductors 25. These binding posts or terminals are shown as carrying a pair of flexible fingers or contact elements 26 cooperating with a pair of metal rings 27 secured to the upper end portion of the stem 14 above the disk 22 and suitably insulated from each other. The rings are shown as being connected by conductors 28 to the respective electrodes so as to complete the circuit through the charge of water in the tank when the switch and valve stem is in the position shown in Fig. 1.

The combined switch and valve stem is shown as having a head or button 29 on its upper end and has a slot 30 cooperating with a seat 31 to limit its upward movement. The lower end of this stem projects through an opening in the bottom wall 16 and is normally urged downwardly by means of an expansible coil spring 32 contacting with the bottom of the container and acting against a cup-shaped washer 33 on the stem. The strength of this spring is such that it does not overcome the spring tension of the thermostatic elements 21 when the stem is in its raised position. The valve stem projects through a water circulating opening 34 in the center of the partition 17 and the upper part of this opening provides a valve seat 35 which cooperates with a valve 36 secured to the stem, the arrangement being such that when the valve stem is released, the expansion spring 32 will immediately seat the valve 36 and open the switch.

The arrangement of the inner container is such that the water being treated circulates through the lower portion of the container entering through openings 37 near the bottom. When it is heated by the electrodes, it rises through the valved opening 34 into the sludge chamber and passes out through opposed circulating openings 38 which are spaced above the bottom of the sludge chamber. These latter circulating openings are adapted to be closed by a valve member in the form of a cross bar 39 secured to the valve plug 36 and presenting angularly bent ends 40 arranged to cover the openings 39 when the valve 36 is seated. When the valves are closed, they trap all sludge collected in the sludge chamber above the partition 17. It will of course be understood that the thermostatic elements are so adjusted with relation to the locking disk 22 that the valve will be released after the water has been heated to desired or predetermined temperature. When this happens, the treated water in the tank may be used immediately without having to wait for any sludge or impurities in suspension to settle because practically all of the sludge and sediment is trapped in the sludge chamber. This greatly increases the capacity of a small purifier and is a very important feature. In the ordinary treatment tanks, it requires about half an hour for the water to cool and the sludge to settle to the bottom before the water can be drawn off.

When the treatment is completed, the treating unit may easily be removed from the tank and the sludge trapped in the sludge chamber flushed out so that the chamber will be thoroughly cleansed before an additional operation. Moreover, the tank itself may be flushed out to remove any sediment that may have accumulated in the bottom. However, the frequency of the cleansing operations will depend upon the amount of impurities in the water being treated. A charge of water may be delivered to it through a filling opening leading into the sludge chamber adapted to be closed by a stopper 41. The treating operation is again started by the simple expedient of lifting the stem 14 by its knob to the locked position shown in Fig. 1.

From the foregoing description, it will be seen that the purifier is very simple and compact in its construction and design and is dependable in operation. There are no delicate parts which require quick replacement or repairs and the capacity is greatly increased over the capacity of other purifiers of the same size. The many uses and advantages of such purifiers will be obvious to those skilled in the art.

Obviously, the present invention is not restricted to the particular embodiment thereof herein shown and described. Moreover, it is not indispensable that all the features of the invention be used conjointly, since they may be employed advantageously in various combinations and subcombinations.

What is claimed is:

1. A water purifier comprising, in combination, a tank; a cover for the tank; a container secured to the cover and suspended in the tank; a partition in said container spaced from said cover providing a sludge chamber; water circulating openings in the lower portion of said container and in said sludge chamber; electrodes in the container; thermal responsive means associated with said electrodes; a combined valve and switch stem projecting into said container and having means cooperating with said thermal responsive means to hold the switch and valve stem in raised position; a valve on said switch and valve stem held normally open by said thermal responsive means; and contact members cooperating with said valve and switch stem to supply current to said electrodes when said stem is in its raised position, said thermal responsive means being adapted to release said stem when the temperature of the water is raised to the desired treating temperature whereby sludge deposited in said sludge chamber is trapped and may be removed.

2. A water purifier of the character described comprising, in combination, a tank; and an electrical purifying unit suspended in said tank including a pair of electrodes; a sludge trapping chamber near the upper portion of the tank having openings through which the liquid normally circulates; and associated switch and valve means connected to cut off the supply of current and simultaneously close the openings in said sludge chamber to trap the sludge therein.

3. In a water purifier of the character described, a tank; a substantially cylindrical container suspended within the tank; a sludge chamber in the upper portion of the cylindrical container having a water circulating opening in the bottom thereof; a pair of electrodes mounted in said container; a source of current supply; and a combined switch and valve stem carrying means to cut off the supply of current and simultaneously trap sludge in said sludge chamber when the water has been treated.

4. In a water purifier of the character described, a tank; a container within the tank having a partition near the upper end thereof to provide a sludge chamber; a valve opening in the bottom of said chamber and said container and said chamber having water circulating openings; a pair of electrodes in said container; bimetallic thermostatic elements on said electrodes subjected to the temperature of the water in said container; a stem projecting through the container; a valve on said stem; switch contact elements on said stem; a stop member also carried by said stem and adapted to be held in position to open said valve and close the switch; valve means also carried by said stem to close the circulating openings in said sludge chamber when said first named valve is closed; and spring means cooperating with said stem normally urging it to its valve closing and switch opening position, said bimetallic thermostatic elements being adapted to release said locking means to permit the stem to move toward its valve closing and switch opening position when the temperature of the water is raised.

5. In combination with an electrical water purifier, a treating unit having electrodes; a sludge chamber having circulating openings therein and forming a part of the treating unit; and associated thermally controlled switch and valve means connected automatically to cut off the supply of current and simultaneously trap the sludge in said sludge chamber when the temperature of the water is raised.

6. In a water purifier of the character described, a tank; a removable cover for the tank; a treating unit secured to the cover and having a sludge chamber presenting circulating openings; electrodes in said treating unit; and thermally controlled associated valve and switch means in said unit connected automatically to trap sludge in said sludge chamber and simultaneously cut off the supply of current to said electrodes.

FRANK G. NEGUS.